United States Patent
Boeckh et al.

(10) Patent No.: US 8,143,209 B2
(45) Date of Patent: *Mar. 27, 2012

(54) CLEANING COMPOSITIONS WITH AMPHIPHILIC GRAFT POLYMERS BASED ON POLYALKYLENE OXIDES AND VINYL ESTERS

(75) Inventors: Dieter Boeckh, Limburgerhof (DE); Lidcay Herrera Taboada, Barcelona (ES); Asimina Kavarnou-Seiler, Griesheim (DE); Gerd Konrad, Speyer (DE); Birgit Reinhard, Limburgerhof (DE); Arturo Luis Casado-Dominguuez, Brussels (BE); Frank Hulskotter, Bad Duerkheim (DE); James Lee Danziger, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/226,185

(22) PCT Filed: May 29, 2007

(86) PCT No.: PCT/EP2007/055198
§ 371 (c)(1),
(2), (4) Date: May 29, 2009

(87) PCT Pub. No.: WO2007/138054
PCT Pub. Date: Dec. 6, 2007

(65) Prior Publication Data
US 2009/0298735 A1 Dec. 3, 2009

(30) Foreign Application Priority Data
May 31, 2006 (EP) .................................. 06114756

(51) Int. Cl.
*C11D 3/37* (2006.01)
*C11D 1/00* (2006.01)

(52) U.S. Cl. ........ 510/475; 510/351; 510/360; 510/361; 510/426

(58) Field of Classification Search .................. 510/351, 510/360, 361, 426, 475
See application file for complete search history.

(56) References Cited

U.S. PATENT DOCUMENTS

| | | | |
|---|---|---|---|
| 4,746,456 A | 5/1988 | Kud et al. | |
| 4,846,994 A | 7/1989 | Kud et al. | |
| 4,904,408 A | 2/1990 | Kud et al. | |
| 4,908,150 A | 3/1990 | Hessel et al. | |
| 5,049,302 A | 9/1991 | Holland et al. | |
| 5,082,585 A | 1/1992 | Hessel et al. | |
| 5,318,719 A | 6/1994 | Hughes et al. | |
| 5,576,282 A | 11/1996 | Miracle et al. | |
| 5,635,554 A | 6/1997 | Boeckh et al. | |
| 5,733,856 A | 3/1998 | Gopalkrishnan et al. | |
| 5,952,432 A | 9/1999 | Yamaguchi et al. | |
| 5,980,931 A | 11/1999 | Fowler et al. | |
| 6,121,165 A | 9/2000 | Mackey et al. | |
| 6,306,812 B1 | 10/2001 | Perkins et al. | |
| 6,326,348 B1 | 12/2001 | Vinson et al. | |
| 6,455,486 B1 * | 9/2002 | Kerobo et al. | 510/421 |
| 7,465,701 B2 * | 12/2008 | Sharma et al. | 510/475 |
| 2003/0224025 A1 | 12/2003 | Gotsche et al. | |
| 2006/0270582 A1 * | 11/2006 | Boeckh et al. | 510/386 |
| 2007/0068557 A1 | 3/2007 | Ortiz et al. | |
| 2008/0015135 A1 * | 1/2008 | de Buzzaccarini et al. | 510/336 |
| 2009/0005287 A1 * | 1/2009 | Boutique et al. | 510/299 |
| 2009/0298735 A1 | 12/2009 | Boeckh et al. | |

FOREIGN PATENT DOCUMENTS

| | | |
|---|---|---|
| EP | 0358472 A2 | 3/1990 |
| EP | 0358473 A2 | 3/1990 |
| EP | 0358474 A2 | 3/1990 |
| EP | 0786514 | 7/1997 |
| GB | 2039938 A | 8/1980 |
| GB | 2304726 A | 3/1997 |
| WO | WO 94/16052 A1 | 7/1994 |
| WO | WO 95/22593 | 8/1995 |
| WO | WO 99/05242 A1 | 2/1999 |
| WO | WO 02/ 8297 A1 | 6/2002 |
| WO | WO 02/50223 A1 | 6/2002 |
| WO | WO 2004/041982 A1 | 5/2004 |
| WO | WO 2005/035706 A2 | 4/2005 |
| WO | WO 2006/130442 A1 | 12/2006 |
| WO | WO 2006/130575 A2 | 12/2006 |

OTHER PUBLICATIONS

PCT International Search Report, dated mailed: Sep. 17, 2007, 38 pages.

* cited by examiner

*Primary Examiner* — Brian P Mruk
(74) *Attorney, Agent, or Firm* — Stephen T Murphy; Leonard W Lewis

(57) ABSTRACT

Laundry detergent and cleaning compositions comprising amphiphilic graft polymers based on water-soluble polyalkylene oxides (A) as a graft base and side chains formed by polymerization of a vinyl ester component (B), said polymers having an average of ≦1 graft site per 50 alkylene oxide units and mean molar masses $M_w$ of from 3000 to 100,000.

12 Claims, No Drawings

CLEANING COMPOSITIONS WITH AMPHIPHILIC GRAFT POLYMERS BASED ON POLYALKYLENE OXIDES AND VINYL ESTERS

REFERENCE TO RELATED APPLICATION

This application claims priority to EP 06114756 filed May 31, 2006.

FIELD OF THE INVENTION

The present invention is directed to laundry compositions and cleaning compositions containing amphiphilic graft polymers based on water-soluble polyalkylene oxides as a graft base and vinyl ester side chains.

SUMMARY OF THE INVENTION

The present invention relates to novel laundry detergents and cleaning compositions comprising new amphiphilic graft polymers based on water-soluble polyalkylene oxides (A) as a graft base and side chains formed by polymerization of a vinyl ester component (B), said polymers having an average of $\leq 1$ graft site per 50 alkylene oxide units and mean molar masses $M_w$ of from 3000 to 100,000. The invention further relates to the use of these amphiphilic graft polymers as a soil detachment-promoting additive to laundry detergents and cleaning compositions.

DETAILED DESCRIPTION OF THE INVENTION

In addition to surfactants, polymers are also used as soil detachment-promoting additives for laundry detergents and cleaning compositions. The known polymers are very suitable, for example, as dispersants of soil pigments such as clay minerals or soot, and as additives which prevent the reattachment of already detached soil. Such dispersants are, though, especially at low temperatures, substantially ineffective in the removal of hydrophobic soil from textiles and hard surfaces.

It was an object of the invention to provide polymers which are suitable as an additive to washing and cleaning compositions, especially to remove hydrophobic soil from textile and hard surfaces.

We have accordingly found amphiphilic graft polymers based on water-soluble polyalkylene oxides (A) as a graft base and side chains formed by polymerization of a vinyl ester component (B), said polymers having an average of $\leq$ one graft site per 50 alkylene oxide units and mean molar masses $M_w$ of from 3000 to 100,000.

We have also found a process for preparing graft polymers, which comprises polymerizing a vinyl ester component (B) composed of vinyl acetate and/or vinyl propionate (B1) and, if desired, a further ethylenically unsaturated monomer (B2), in the presence of a water-soluble polyalkylene oxide (A), a free radical-forming initiator (C) and, if desired, up to 40% by weight, based on the sum of components (A), (B) and (C), of an organic solvent (D), at a mean polymerization temperature at which the initiator (C) has a decomposition half-life of from 40 to 500 min, in such a way that the fraction of unconverted graft monomer (B) and initiator (C) in the reaction mixture is constantly kept in a quantitative deficiency relative to the polyalkylene oxide (A).

The inventive graft polymers are characterized by their low degree of branching (degree of grafting). They have, on average, based on the reaction mixture obtained, not more than 1 graft site, preferably not more than 0.6 graft site, more preferably not more than 0.5 graft site and most preferably not more than 0.4 graft site per 50 alkylene oxide units. They comprise, on average, based on the reaction mixture obtained, preferably at least 0.05, in particular at least 0.1 graft site per 50 alkylene oxide units. The degree of branching can be determined, for example, by means of $^{13}$C NMR spectroscopy from the integrals of the signals of the graft sites and the —CH$_2$-groups of the polyalkylene oxide.

In accordance with their low degree of branching, the molar ratio of grafted to ungrafted alkylene oxide units in the inventive graft polymers is from 0.002 to 0.05, preferably from 0.002 to 0.035, more preferably from 0.003 to 0.025 and most preferably from 0.004 to 0.02.

Preferred embodiments of the inventive graft polymers feature a narrow molar mass distribution and hence a polydispersity $M_w/M_n$ of generally $\leq 3$, preferably $\leq 2.5$ and more preferably $\leq 2.3$. Most preferably, their polydispersity $M_w/M_n$ is in the range from 1.5 to 2.2. The polydispersity of the graft polymers can be determined, for example, by gel permeation chromatography using narrow-distribution polymethyl methacrylates as the standard.

The mean weight average molecular weight $M_w$ of the inventive graft polymers is from 3000 to 100,000, preferably from 6000 to 45,000 and more preferably from 8000 to 30,000.

Owing to their low degree of branching and their low polydispersity, the amphiphilic character and the block polymer structure of the inventive graft polymers is particularly marked.

Other preferred embodiments of the inventive graft polymers also have only a low content of ungrafted polyvinyl ester (B). In general, they comprise $\leq 10\%$ by weight, preferably $\leq 7.5\%$ by weight and more preferably $\leq 5\%$ by weight of ungrafted polyvinyl ester (B).

Owing to the low content of ungrafted polyvinyl ester and the balanced ratio of components (A) and (B), the inventive graft polymers are soluble in water or in water/alcohol mixtures (for example a 25% by weight solution of diethylene glycol monobutyl ether in water). They have pronounced, low cloud points which, for the graft polymers soluble in water at up to 50° C., are generally $\leq 95°$ C., preferably $\leq 85°$ C. and more preferably $\leq 75°$ C., and, for the other graft polymers in 25% by weight diethylene glycol monobutyl ether, generally $\leq 90°$ C., preferably from 45 to 85° C.

The inventive amphiphilic graft polymers have preferably
(A) from 20 to 70% by weight of a water-soluble polyalkylene oxide as a graft base and
(B) side chains formed by free-radical polymerization of from 30 to 80% by weight of a vinyl ester component composed of
  (B1) from 70 to 100% by weight of vinyl acetate and/or vinyl propionate and
  (B2) from 0 to 30% by weight of a further ethylenically unsaturated monomer in the presence of (A).

More preferably, they comprise from 25 to 60% by weight of the graft base (A) and from 40 to 75% by weight of the polyvinyl ester component (B).

Water-soluble polyalkylene oxides suitable for forming the graft base (A) are in principle all polymers based on $C_2$-$C_4$-alkylene oxides which comprise at least 50% by weight, preferably at least 60% by weight, more preferably at least 75% by weight of ethylene oxide in copolymerized form.

The polyalkylene oxides (A) preferably have a low polydispersity $M_w/M_n$. Their polydispersity is preferably $\leq 1.5$.

The polyalkylene oxides (A) may be the corresponding polyalkylene glycols in free form, i.e. with OH end groups, but they may also be capped at one or both end groups.

Suitable end groups are, for example, $C_1$-$C_{25}$-alkyl, phenyl and $C_1$-$C_{14}$-alkylphenyl groups.

Specific examples of particularly suitable polyalkylene oxides (A) include:
- (A1) polyethylene glycols which may be capped at one or both end groups, especially by $C_1$-$C_{25}$-alkyl groups, but are preferably not etherified, and have mean molar masses $M_n$ of preferably from 1500 to 20,000, more preferably from 2500 to 15,000;
- (A2) copolymers of ethylene oxide and propylene oxide and/or butylene oxide with an ethylene oxide content of at least 50% by weight, which may likewise be capped at one or both end groups, especially by $C_1$-$C_{25}$-alkyl groups, but are preferably not etherified, and have mean molar masses $M_n$ of preferably from 1500 to 20,000, more preferably from 2500 to 15,000;
- (A3) chain-extended products having mean molar masses of in particular from 2500 to 20,000, which are obtainable by reacting polyethylene glycols (A1) having mean molar masses $M_n$ of from 200 to 5000 or copolymers (A2) having mean molar masses $M_n$ of from 200 to 5000 with $C_2$-$C_{12}$-dicarboxylic acids or -dicarboxylic esters or $C_6$-$C_{18}$-diisocyanates.

Preferred graft bases (A) are the polyethylene glycols (A1).

The side chains of the inventive graft polymers are formed by polymerization of a vinyl ester component (B) in the presence of the graft base (A).

The vinyl ester component (B) may consist advantageously of (B1) vinyl acetate or vinyl propionate or of mixtures of vinyl acetate and vinyl propionate, particular preference being given to vinyl acetate as the vinyl ester component (B).

However, the side chains of the graft polymer can also be formed by copolymerizing vinyl acetate and/or vinyl propionate (B1) and a further ethylenically unsaturated monomer (B2). The fraction of monomer (B2) in the vinyl ester component (B) may be up to 30% by weight, which corresponds to a content in the graft polymer of (B2) of 24% by weight.

Suitable comonomers (B2) are, for example, monoethylenically unsaturated carboxylic acids and dicarboxylic acids and their derivatives, such as esters, amides and anhydrides, and styrene. It is of course also possible to use mixtures of different comonomers.

Specific examples include: (meth)acrylic acid, $C_1$-$C_{12}$-alkyl and hydroxy-$C_2$-$C_{12}$-alkyl esters of (meth)acrylic acid, (meth)acrylamide, N—$C_1$-$C_{12}$-alkyl(meth)acrylamide, N,N-di($C_1$-$C_6$-alkyl)(meth)acrylamide, maleic acid, maleic anhydride and mono($C_1$-$C_{12}$-alkyl)esters of maleic acid.

Preferred monomers (B2) are the $C_1$-$C_8$-alkyl esters of (meth)acrylic acid and hydroxyethyl acrylate, particular preference being given to the $C_1$-$C_4$-alkyl esters of (meth)acrylic acid.

Very particularly preferred monomers (B2) are methyl acrylate, ethyl acrylate and in particular n-butyl acrylate.

When the inventive graft polymers comprise the monomers (B2) as a constituent of the vinyl ester component (B), the content of graft polymers in (B2) is preferably from 0.5 to 20% by weight, more preferably from 1 to 15% by weight and most preferably from 2 to 10% by weight.

The inventive graft polymers are advantageously obtainable by the process which is likewise in accordance with the invention, by polymerizing a vinyl ester component (B) composed of vinyl acetate and/or vinyl propionate (B1) and, if desired, a further ethylenically unsaturated monomer (B2), in the presence of a water-soluble polyalkylene oxide (A), a free radical-forming initiator (C) and, if desired, up to 40% by weight, based on the sum of components (A), (B) and (C), of an organic solvent (D), at a mean polymerization temperature at which the initiator (C) has a decomposition half-life of from 40 to 500 min, in such a way that the fraction of unconverted graft monomer (B) and initiator (C) in the reaction mixture is constantly kept in a quantitative deficiency relative to the polyalkylene oxide (A).

In this process, preference is given to using from 30 to 80% by weight of a vinyl ester component (B) composed of
- (B1) from 70 to 100% by weight of vinyl acetate and/or vinyl propionate and
- (B2) from 0 to 30% by weight of a further ethylenically unsaturated monomer and from 20 to 70% by weight of a water-soluble polyalkylene oxide (A) of mean molar mass $M_n$ of from 1500 to 20,000.

The amount of initiator (C) is preferably from 0.2 to 5% by weight, in particular from 0.5 to 3.5% by weight, based in each case on component (B).

For the process according to the invention, it is essential that the steady-state concentration of radicals present at the mean polymerization temperature is substantially constant and the graft monomer (B) is present in the reaction mixture constantly only in low concentration (for example of not more than 5% by weight). This allows the reaction to be controlled, and graft polymers can be prepared in a controlled manner with the desired low degree of branching and the desired low polydispersity.

The term "mean polymerization temperature" is intended to mean here that, although the process is substantially isothermal, there may, owing to the exothermicity of the reaction, be temperature variations which are preferably kept within the range of $+/-10°$ C., more preferably in the range of $+/-5°$ C.

According to the invention, the free radical-forming initiator (C) at the mean polymerization temperature should have a decomposition half-life of from 40 to 500 min, preferably from 50 to 400 min and more preferably from 60 to 300 min.

According to the invention, the initiator (C) and the graft monomer (B) are advantageously added in such a way that a low and substantially constant concentration of undecomposed initiator and graft monomer (B) is present in the reaction mixture. The proportion of undecomposed initiator in the overall reaction mixture is preferably $\leq 15\%$ by weight, in particular $\leq 10\%$ by weight, based on the total amount of initiator metered in during the monomer addition.

The mean polymerization temperature is appropriately in the range from 50 to 140° C., preferably from 60 to 120° C. and more preferably from 65 to 110° C.

Examples of suitable initiators (C) whose decomposition half-life in the temperature range from 50 to 140° C. is from 20 to 500 min are:
- O—$C_2$-$C_{12}$-acylated derivatives of tert-$C_4$-$C_{12}$-alkyl hydroperoxides and tert-($C_9$-$C_{12}$-aralkyl)hydroperoxides, such as tert-butyl peroxyacetate, tert-butyl monoperoxymaleate, tert-butyl peroxyisobutyrate, tert-butyl peroxypivalate, tert-butyl peroxyneoheptanoate, tert-butyl peroxy-2-ethylhexanoate, tert-butyl peroxy-3,5,5-trimethylhexanoate, tert-butyl peroxyneodecanoate, tert-amyl peroxypivalate, tert-amyl peroxy-2-ethylhexanoate, tert-amyl peroxyneodecanoate, 1,1,3,3-tetramethylbutyl peroxyneodecanoate, cumyl peroxyneodecanoate, tert-butyl peroxybenzoate, tert-amyl peroxybenzoate and di-tert-butyl diperoxyphthalate;
- di-O—$C_4$-$C_{12}$-acylated derivatives of tert-$C_8$-$C_{14}$-alkylene bisperoxides, such as 2,5-dimethyl-2,5-di(2-ethylhexanoylperoxy)hexane, 2,5-dimethyl-2,5-di(benzoylperoxy)hexane and 1,3-di(2-neodecanoylperoxyisopropyl)benzene;

di($C_2$-$C_{12}$-alkanoyl) and dibenzoyl peroxides, such as diacetyl peroxide, dipropionyl peroxide, disuccinyl peroxide, dicaproyl peroxide, di(3,5,5-trimethylhexanoyl) peroxide, didecanoyl peroxide, dilauroyl peroxide, dibenzoyl peroxide, di(4-methylbenzoyl) peroxide, di(4-chlorobenzoyl) peroxide and di(2,4-dichlorobenzoyl) peroxide;

tert-$C_4$-$C_5$-alkyl peroxy($C_4$-$C_{12}$-alkyl)carbonates, such as tert-amyl peroxy(2-ethylhexyl)carbonate;

di($C_2$-$C_{12}$-alkyl)peroxydicarbonates, such as di(n-butyl) peroxydicarbonate and di(2-ethylhexyl)peroxydicarbonate.

Depending on the mean polymerization temperature, examples of particularly suitable initiators (C) are:

at a mean polymerization temperature of from 50 to 60° C.: tert-butyl peroxyneoheptanoate, tert-butyl peroxyneodecanoate, tert-amyl peroxypivalate, tert-amyl peroxyneodecanoate, 1,1,3,3-tetramethylbutyl peroxyneodecanoate, cumyl peroxyneodecanoate, 1,3-di(2-neodecanoyl peroxyisopropyl)benzene, di(n-butyl) peroxydicarbonate and di(2-ethyl hexyl)peroxydicarbonate;

at a mean polymerization temperature of from 60 to 70° C.: tert-butyl peroxypivalate, tert-butyl peroxyneoheptanoate, tert-butyl peroxyneodecanoate, tert-amyl peroxypivalate and di(2,4-dichlorobenzoyl) peroxide;

at a mean polymerization temperature of from 70 to 80° C.: tert-butyl peroxypivalate, tert-butyl peroxyneoheptanoate, tert-amyl peroxypivalate, dipropionyl peroxide, dicaproyl peroxide, didecanoyl peroxide, dilauroyl peroxide, di(2,4-dichlorobenzoyl)peroxide and 2,5-dimethyl2,5-di(2-ethylhexanoylperoxy)hexane;

at a mean polymerization temperature of from 80 to 90° C.: tert-butyl peroxyisobutyrate, tert-butyl peroxy-2-ethylhexanoate, tert-amyl peroxy-2-ethylhexanoate, dipropionyl peroxide, dicaproyl peroxide, didecanoyl peroxide, dilauroyl peroxide, di(3,5,5-trimethylhexanoyl) peroxide, dibenzoyl peroxide and di(4-methylbenzoyl) peroxide;

at a mean polymerization temperature of from 90 to 100° C.: tert-butyl peroxyisobutyrate, tert-butyl peroxy-2-ethylhexanoate, tert-butyl monoperoxymaleate, tert-amyl peroxy-2-ethylhexanoate, dibenzoyl peroxide and di(4-methylbenzoyl)peroxide;

at a mean polymerization temperature of from 100 to 110° C.: tert-butyl monoperoxymaleate, tert-butyl peroxyisobutyrate and tert-amyl peroxy(2-ethylhexyl)carbonate;

at a mean polymerization temperature of from 110 to 120° C.: tert-butyl monoperoxymaleate, tert-butyl peroxy-3,5,5-trimethylhexanoate and tert-amyl peroxy(2-ethylhexyl)carbonate.

Preferred initiators (C) are O—$C_4$-$C_{12}$-acylated derivatives of tert-$C_4$-$C_5$-alkyl hydroperoxides, particular preference being given to tert-butyl peroxypivalate and tert-butyl peroxy-2-ethylhexanoate.

Particularly advantageous polymerization conditions can be established effortlessly by precise adjustment of initiator (C) and polymerization temperature. For instance, the preferred mean polymerization temperature in the case of use of tert-butyl peroxypivalate is from 60 to 80° C., and, in the case of tert-butyl peroxy-2-ethylhexanoate, from 80 to 100° C.

The inventive polymerization reaction can be carried out in the presence of small amounts of an organic solvent (D). It is of course also possible to use mixtures of different solvents (D). Preference is given to using water-soluble or water-miscible solvents.

When a solvent (D) is used as a diluent, generally from 1 to 40% by weight, preferably from 1 to 35% by weight, more preferably from 1.5 to 30% by weight, most preferably from 2 to 25% by weight, based in each case on the sum of the components (A), (B) and (C), are used.

Examples of suitable solvents (D) include:

monohydric alcohols, preferably aliphatic $C_1$-$C_{16}$-alcohols, more preferably aliphatic $C_2$-$C_{12}$-alcohols, most preferably $C_2$-$C_4$-alcohols, such as ethanol, propanol, isopropanol, butanol, sec-butanol and tert-butanol;

polyhydric alcohols, preferably $C_2$-$C_{10}$-diols, more preferably $C_2$-$C_6$-diols, most preferably $C_2$-$C_4$-alkylene glycols, such as ethylene glycol and propylene glycol;

alkylene glycol ethers, preferably alkylene glycol mono ($C_1$-$C_{12}$-alkyl) ethers and alkylene glycol di($C_1$-$C_6$-alkyl)ethers, more preferably alkylene glycol mono- and di($C_1$-$C_2$-alkyl)ethers, most preferably alkylene glycol mono($C_1$-$C_2$-alkyl)ethers, such as ethylene glycol monomethyl and -ethyl ether and propylene glycol mono-methyl and -ethyl ether;

polyalkylene glycols, preferably poly($C_2$-$C_4$-alkylene) glycols having 2-20 $C_2$-$C_4$-alkylene glycol units, more preferably polyethylene glycols having 2-20 ethylene glycol units and polypropylene glycols having 2-10 propylene glycol units, most preferably polyethylene glycols having 2-15 ethylene glycol units and polypropylene glycols having 2-4 propylene glycol units, such as diethylene glycol, triethylene glycol, dipropylene glycol and tripropylene glycol;

polyalkylene glycol monoethers, preferably poly($C_2$-$C_4$-alkylene)glycol mono($C_1$-$C_{25}$-alkyl) ethers having 2-20 alkylene glycol units, more preferably poly($C_2$-$C_4$-alkylene)glycol mono($C_1$-$C_{20}$-alkyl)ethers having 2-20 alkylene glycol units, most preferably poly($C_2$-$C_3$-alkylene)glycol mono($C_1$-$C_{16}$-alkyl)ethers having 3-20 alkylene glycol units;

carboxylic esters, preferably $C_1$-$C_8$-alkyl esters of $C_1$-$C_6$-carboxylic acids, more preferably $C_1$-$C_4$-alkyl esters of $C_1$-$C_3$-carboxylic acids, most preferably $C_2$-$C_4$-alkyl esters of $C_2$-$C_3$-carboxylic acids, such as ethyl acetate and ethyl propionate;

aliphatic ketones which preferably have from 3 to 10 carbon atoms, such as acetone, methyl ethyl ketone, diethyl ketone and cyclohexanone;

cyclic ethers, in particular tetrahydrofuran and dioxane.

The solvents (D) are advantageously those solvents which are also used to formulate the inventive graft polymers for use (for example in washing and cleaning compositions) and can therefore remain in the polymerization product.

Preferred examples of these solvents are polyethylene glycols having 2-15 ethylene glycol units, polypropylene glycols having 2-6 propylene glycol units and in particular alkoxylation products of $C_6$-$C_8$-alcohols (alkylene glycol monoalkyl ethers and polyalkylene glycol monoalkyl ethers).

Particular preference is given here to alkoxylation products of $C_8$-$C_{16}$-alcohols with a high degree of branching, which allow the formulation of polymer mixtures which are free-flowing at 40-70° C. and have a very low polymer content at comparatively low viscosity. The branching may be present in the alkyl chain of the alcohol and/or in the polyalkoxylate moiety (copolymerization of at least one propylene oxide, butylene oxide or isobutylene oxide unit). Particularly suitable examples of these alkoxylation products are 2-ethylhexanol or 2-propylheptanol alkoxylated with 1-15 mol of ethylene oxide, $C_{13}/C_{15}$ oxo alcohol or $C12/C_{14}$ or $C_{16}/C_{18}$ fatty alcohol alkoxylated with 1-15 mol of ethylene oxide and 1-3 mol of propylene oxide, preference being given to 2-propylheptanol alkoxylated with 1-15 mol of ethylene oxide and 1-3 mol of propylene oxide.

In the process according to the invention, polyalkylene oxide (A), graft monomer (B1) and, if appropriate, (B2), initiator (C) and, if appropriate, solvent (D) are heated to the selected mean polymerization temperature in a reactor.

According to the invention, the polymerization is carried out in such a way that an excess of polymer (polyalkylene oxide (A) and formed graft polymer) is constantly present in the reactor. The quantitative ratio of polymer to ungrafted monomer and initiator is generally $\geq 10:1$, preferably $\geq 15:1$ and more preferably $\geq 20:1$.

The polymerization process according to the invention can in principle be carried out in various reactor types.

The reactor used is preferably a stirred tank in which the polyalkylene oxide (A), if appropriate together with portions, of generally up to 15% by weight of the particular total amount, of graft monomers (B), initiator (C) and solvent (D), are initially charged fully or partly and heated to the polymerization temperature, and the remaining amounts of (B), (C) and, if appropriate, (D) are metered in, preferably separately. The remaining amounts of (B), (C) and, if appropriate, (D) are metered in preferably over a period of $\geq 2$ h, more preferably of $\geq 4$ h and most preferably of $\geq 5$ h.

In the case of the particularly preferred, substantially solvent-free process variant, the entire amount of polyalkylene oxide (A) is initially charged as a melt and the graft monomers (B1) and, if appropriate, (B2), and also the initiator (C) present preferably in the form of a from 10 to 50% by weight solution in one of the solvents (D), are metered in, the temperature being controlled such that the selected polymerization temperature, on average during the polymerization, is maintained with a range of especially $+/-10°$ C., in particular $+/-5°$ C.

In a further particularly preferred, low-solvent process variant, the procedure is as described above, except that solvent (D) is metered in during the polymerization in order to limit the viscosity of the reaction mixture. It is also possible to commence with the metered addition of the solvent only at a later time with advanced polymerization, or to add it in portions.

The polymerization can be effected under standard pressure or at reduced or elevated pressure. When the boiling point of the monomers (B) or of any diluent (D) used is exceeded at the selected pressure, the polymerization is carried out with reflux cooling.

Owing to their marked amphiphilic character, the inventive graft polymers have particularly favorable interface properties. They can be used advantageously in washing and cleaning compositions, where they support the removal of hydrophobic soils from textile or hard surfaces by the surfactants and thus improve the washing and cleaning performances of the formulations. Moreover, they bring about better dispersion of the removed soil in the washing or cleaning liquor and prevent its redeposition onto the surfaces of the washed or cleaned materials.

Laundry Detergents and Cleaning Compositions

The inventive laundry detergents and cleaning compositions of the present invention comprise generally from 0.05 to 10% by weight, preferably from 0.1 to 5% by weight and more preferably from 0.25 to 2.5% by weight, based on the particular overall composition, of the amphiphilic graft polymers of the present invention.

In addition, the laundry detergents and cleaning compositions generally comprise surfactants and, if appropriate, other polymers as washing substances, builders and further customary ingredients, for example cobuilders, complexing agents, bleaches, standardizers, graying inhibitors, dye transfer inhibitors, enzymes and perfumes.

The amphiphilic graft polymers of the present invention may be utilized in laundry detergents or cleaning compositions comprising a surfactant system comprising $C_{10}-C_{15}$ alkyl benzene sulfonates (LAS) and one or more co-surfactants selected from nonionic, cationic, anionic or mixtures thereof. The selection of co-surfactant may be dependent upon the desired benefit. In one embodiment, the co-surfactant is selected as a nonionic surfactant, preferably $C_{12}-C_{18}$ alkyl ethoxylates. In another embodiment, the co-surfactant is selected as an anionic surfactant, preferably $C_{10}-C_{18}$ alkyl alkoxy sulfates (AE$_x$S) wherein x is from 1-30. In another embodiment the co-surfactant is selected as a cationic surfactant, preferably dimethyl hydroxyethyl lauryl ammonium chloride. If the surfactant system comprises $C_{10}-C_{15}$ alkyl benzene sulfonates (LAS), the LAS is used at levels ranging from about 9% to about 25%, or from about 13% to about 25%, or from about 15% to about 23% by weight of the composition.

The surfactant system may comprise from 0% to about 7%, or from about 0.1% to about 5%, or from about 1 % to about 4% by weight of the composition of a co-surfactant selected from a nonionic co-surfactant, cationic co-surfactant, anionic co-surfactant and any mixture thereof.

Non-limiting examples of nonionic co-surfactants include: $C_{12}-C_{18}$ alkyl ethoxylates, such as, NEODOL® nonionic surfactants from Shell; $C_6-C_{12}$ alkyl phenol alkoxylates wherein the alkoxylate units are a mixture of ethyleneoxy and propyleneoxy units; $C_{12}-C_{18}$ alcohol and $C_6-C_{12}$ alkyl phenol condensates with ethylene oxide/propylene oxide block alkyl polyamine ethoxylates such as PLURONIC® from BAS F; $C_{14}-C_{22}$ mid-chain branched alcohols, BA, as discussed in U.S. Pat. No. 6,150,322; $C_{14}-C_{22}$ mid-chain branched alkyl alkoxylates, BAE$_x$, wherein x is from 1-30, as discussed in U.S. Pat. Nos. 6,153,577, 6,020,303 and 6,093,856; Alkylpolysaccharides as discussed in U.S. Pat. No. 4,565,647 Llenado, issued Jan. 26, 1986; specifically alkylpolyglycosides as discussed in U.S. Pat. Nos. 4,483,780 and 4,483,779; Polyhydroxy fatty acid amides as discussed in U.S. Pat. No. 5,332,528; and ether capped poly(oxyalkylated) alcohol surfactants as discussed in U.S. Pat. No. 6,482,994 and WO 01/42408.

Non-limiting examples of semi-polar nonionic co-surfactants include: water-soluble amine oxides containing one alkyl moiety of from about 10 to about 18 carbon atoms and 2 moieties selected from the group consisting of alkyl moieties and hydroxyalkyl moieties containing from about 1 to about 3 carbon atoms; water-soluble phosphine oxides containing one alkyl moiety of from about 10 to about 18 carbon atoms and 2 moieties selected from the group consisting of alkyl moieties and hydroxyalkyl moieties containing from about 1 to about 3 carbon atoms; and water-soluble sulfoxides containing one alkyl moiety of from about 10 to about 18 carbon atoms and a moiety selected from the group consisting of alkyl moieties and hydroxyalkyl moieties of from about 1 to about 3 carbon atoms. See WO 01/32816, U.S. Pat. Nos. 4,681,704, and 4,133,779.

Non-limiting examples of cationic co-surfactants include: the quaternary ammonium surfactants, which can have up to 26 carbon atoms include: alkoxylate quaternary ammonium (AQA) surfactants as discussed in U.S. Pat. No. 6,136,769; dimethyl hydroxyethyl quaternary ammonium as discussed in U.S. Pat. No. 6,004,922; dimethyl hydroxyethyl lauryl ammonium chloride; polyamine cationic surfactants as discussed in WO 98/35002, WO 98/35003, WO 98/35004, WO 98/35005, and WO 98/35006; cationic ester surfactants as discussed in U.S. Pat. Nos. 4,228,042, 4,239,660 4,260,529 and 6,022,844; and amino surfactants as discussed in U.S. Pat. No. 6,221,825 and WO 00/47708, specifically amido propyldimethyl amine (APA).

Nonlimiting examples of anionic co-surfactants useful herein include: $C_{10}$-$C_{20}$ primary, branched chain and random alkyl sulfates (AS); $C_{10}$-$C_{18}$ secondary (2,3) alkyl sulfates; $C_{10}$-$C_{18}$ alkyl alkoxy sulfates ($AE_xS$) wherein x is from 1-30; $C_{10}$-$C_{18}$ alkyl alkoxy carboxylates comprising 1-5 ethoxy units; mid-chain branched alkyl sulfates as discussed in U.S. Pat. Nos. 6,020,303 and 6,060,443; mid-chain branched alkyl alkoxy sulfates as discussed in U.S. Pat. Nos. 6,008,181 and 6,020,303; modified alkylbenzene sulfonate (MLAS) as discussed in WO 99/05243, WO 99/05242 and WO 99/05244; methyl ester sulfonate (MES); and alpha-olefin sulfonate (AOS).

The present invention may also relates to compositions comprising the inventive amphiphilic graft polymers and a surfactant system comprising $C_8$-$C_{18}$ linear alkyl sulphonate surfactant and a co-surfactant. The compositions can be in any form, namely, in the form of a liquid; a solid such as a powder, granules, agglomerate, paste, tablet, pouches, bar, gel; an emulsion; types delivered in dual-compartment containers; a spray or foam detergent; premoistened wipes (i.e., the cleaning composition in combination with a nonwoven material such as that discussed in U.S. Pat. No. 6,121,165, Mackey, et al.); dry wipes (i.e., the cleaning composition in combination with a nonwoven materials, such as that discussed in U.S. Pat. Nos. 5,980,931, Fowler, et al.) activated with water by a consumer; and other homogeneous or multiphase consumer cleaning product forms.

In one embodiment, the cleaning composition of the present invention is a liquid or solid laundry detergent composition. In another embodiment, the cleaning composition of the present invention is a hard surface cleaning composition, preferably wherein the hard surface cleaning composition impregnates a nonwoven substrate. As used herein "impregnate" means that the hard surface cleaning composition is placed in contact with a nonwoven substrate such that at least a portion of the nonwoven substrate is penetrated by the hard surface cleaning composition, preferably the hard surface cleaning composition saturates the nonwoven substrate. The cleaning composition may also be utilized in car care compositions, for cleaning various surfaces such as hard wood, tile, ceramic, plastic, leather, metal, glass. This cleaning composition could be also designed to be used in a personal care and pet care compositions such as shampoo composition, body wash, liquid or solid soap and other cleaning composition in which surfactant comes into contact with free hardness and in all compositions that require hardness tolerant surfactant system, such as oil drilling compositions.

In another embodiment the cleaning composition is a dish cleaning composition, such as liquid hand dishwashing compositions, solid automatic dishwashing compositions, liquid automatic dishwashing compositions, and tab/unit does forms of automatic dishwashing compositions.

Quite typically, cleaning compositions herein such as laundry detergents, laundry detergent additives, hard surface cleaners, synthetic and soap-based laundry bars, fabric softeners and fabric treatment liquids, solids and treatment articles of all kinds will require several adjuncts, though certain simply formulated products, such as bleach additives, may require only, for example, an oxygen bleaching agent and a surfactant as described herein. A comprehensive list of suitable laundry or cleaning adjunct materials can be found in WO 99/05242.

Common cleaning adjuncts include builders, enzymes, polymers not discussed above, bleaches, bleach activators, catalytic materials and the like excluding any materials already defined hereinabove. Other cleaning adjuncts herein can include suds boosters, suds suppressors (antifoams) and the like, diverse active ingredients or specialized materials such as dispersant polymers (e.g., from BASF Corp. or Rohm & Haas) other than those described above, color speckles, silvercare, anti-tarnish and/or anti-corrosion agents, dyes, fillers, germicides, alkalinity sources, hydrotropes, anti-oxidants, enzyme stabilizing agents, pro-perfumes, perfumes, solubilizing agents, carriers, processing aids, pigments, and, for liquid formulations, solvents, chelating agents, dye transfer inhibiting agents, dispersants, brighteners, suds suppressors, dyes, structure elasticizing agents, fabric softeners, anti-abrasion agents, hydrotropes, processing aids, and other fabric care agents, surface and skin care agents. Suitable examples of such other cleaning adjuncts and levels of use are found in U.S. Pat. Nos. 5,576,282, 6,306,812 B1 and 6,326, 348 B1.

Method of Use

The present invention includes a method for cleaning a targeted surface. As used herein "targeted surface" may include such surfaces such as fabric, dishes, glasses, and other cooking surfaces, hard surfaces, hair or skin. As used herein "hard surface" includes hard surfaces being found in a typical home such as hard wood, tile, ceramic, plastic, leather, metal, glass. Such method includes the steps of contacting the composition comprising the modified polyol compound, in neat form or diluted in wash liquor, with at least a portion of a targeted surface then optionally rinsing the targeted surface. Preferably the targeted surface is subjected to a washing step prior to the aforementioned optional rinsing step. For purposes of the present invention, washing includes, but is not limited to, scrubbing, wiping and mechanical agitation.

As will be appreciated by one skilled in the art, the cleaning compositions of the present invention are ideally suited for use in home care (hard surface cleaning compositions) and/or laundry applications.

The composition solution pH is chosen to be the most complimentary to a target surface to be cleaned spanning broad range of pH, from about 5 to about 11. For personal care such as skin and hair cleaning pH of such composition preferably has a pH from about 5 to about 8 for laundry cleaning compositions pH of from about 8 to about 10. The compositions are preferably employed at concentrations of from about 200 ppm to about 10,000 ppm in solution. The water temperatures preferably range from about 5° C. to about 100° C.

For use in laundry cleaning compositions, the compositions are preferably employed at concentrations from about 200 ppm to about 10000 ppm in solution (or wash liquor). The water temperatures preferably range from about 5° C. to about 60° C. The water to fabric ratio is preferably from about 1:1 to about 20:1.

The method may include the step of contacting a nonwoven substrate impregnated with an embodiment of the composition of the present invention As used herein "non-woven substrate" can comprise any conventionally fashioned nonwoven sheet or web having suitable basis weight, caliper (thickness), absorbency and strength characteristics. Examples of suitable commercially available nonwoven substrates include those marketed under the tradename SONTARA® by DuPont and POLYWEB® by James River Corp.

As will be appreciated by one skilled in the art, the cleaning compositions of the present invention are ideally suited for use in liquid dish cleaning compositions. The method for using a liquid dish composition of the present invention comprises the steps of contacting soiled dishes with an effective amount, typically from about 0.5 ml. to about 20 ml. (per 25 dishes being treated) of the liquid dish cleaning composition of the present invention diluted in water.

POLYMER EXAMPLES

The inventive amphiphilic graft polymers may be prepared as follows. The K values may be measured in 3% by weight aqueous NaCl solution at 23° C. and a polymer concentration of 1% by weight. The mean molar masses and polydispersities are determined by gel permeation chromatography using a 0.5% by weight LiBr solution in dimethylacetamide as the eluent and of polymethyl methacrylate (PMMA) as the standard. The degrees of branching may be determined by $^{13}$C NMR spectroscopy in deuterated dimethyl sulfoxide from the integrals of the signals of the graft sites and the —$CH_2$-groups of the polyethylene glycol. The values reported relate to all of the polyethylene glycol present in the product, i.e. including ungrafted polyethylene glycol, and correspond to the number of side chains present on average per polyethylene glycol.

Graft Polymer 1

A polymerization vessel equipped with stirrer and reflux condenser is initially charged with 480 g of polyethylene glycol ($M_n$ 12,000) under a nitrogen atmosphere and melted at 70° C.

After addition of 16.0 g of vinyl acetate and 0.2 g of tert-butyl peroxypivalate, dissolved in 0.9 g of dipropylene glycol, and stirring for a further 5 minutes, 304 g of vinyl acetate within 6 h (feed 1) and 4.0 g of tert-butyl peroxypivalate, dissolved in 18 g of dipropylene glycol, within 7 h (feed 2) are metered in in parallel continuously with constant flow rates at internal temperature 70° C. with stirring.

After feed 2 has ended and the mixture has been stirred at 70° C. for a further hour, 4.8 g of tert-butyl peroxypivalate, dissolved in 9.0 g of dipropylene glycol, are added in 3 portions at 70° C. with further stirring for two hours in each case. In addition, 73 g of dipropylene glycol are added to lower the viscosity.

Residual amounts of vinyl acetate are removed by vacuum distillation at 70° C. Subsequently, a solids content of 24.3% by weight is established by adding water.

The resulting graft polymer has a K value of 28.4, a polydispersity of 1.8 (weight average molecular weight, $M_w$, 36,900, and number average molecular weight, $M_n$, 21,000) and a degree of branching of 0.8% (corresponds to 0.15 graft site/50 EO units).

Graft Polymer 2

A polymerization vessel equipped with stirrer and reflux condenser is initially charged with 400 g of polyethylene glycol ($M_n$ 9000) under a nitrogen atmosphere and melted at 85° C.

After addition of 20.0 g of vinyl acetate and 0.25 g of tert-butyl peroxy-2-ethylhexanoate, dissolved in 0.9 g of dipropylene glycol, and stirring for a further 5 minutes, 380 g of vinyl acetate within 6 h (feed 1) and 5.0 g of tert-butyl peroxy-2-ethylhexanoate, dissolved in 18 g of dipropylene glycol, within 7 h (feed 2) are metered in in parallel continuously with constant flow rates at internal temperature 85° C. with stirring.

After feed 2 has ended and the mixture has been stirred at 85° C. for a further hour, 6.0 g of tert-butyl peroxy-2-ethylhexanoate, dissolved in 9.0 g of dipropylene glycol, are added in 3 portions at 85° C. with further stirring for two hours in each case. In addition, 73 g of dipropylene glycol are added to lower the viscosity.

Residual amounts of vinyl acetate are removed by vacuum distillation at 85° C. Subsequently, a solids content of 23.2% by weight is established by adding water.

The resulting graft polymer has a K value of 24.0, a polydispersity of 1.9 ($M_w$ 37 000, $M_n$ 19 500) and a degree of branching of 0.8% (corresponds to 0.20 graft site/50 EO units).

Graft Polymer 3

A polymerization pressure vessel equipped with stirrer and reflux condenser is initially charged with 1000 g of polyethylene glycol ($M_n$ 6000) under a nitrogen atmosphere and melted at 90° C.

Then, 1500 g of vinyl acetate within 6 h (feed 1) and 14.5 g of tert-butyl peroxy-2-ethylhexanoate, dissolved in 60.5 g of tripropylene glycol, within 7 h (feed 2) are metered in in parallel continuously with constant flow rates at internal temperature 90° C. with stirring.

After feed 2 has ended and the mixture has been stirred at 90° C. for a further hour, 17.1 g of tert-butyl peroxy-2-ethylhexanoate, dissolved in 22.6 g of tripropylene glycol, are added in 3 portions at 90° C. with further stirring for two hours in each case. In addition, 73 g of dipropylene glycol are added to lower the viscosity.

Residual amounts of vinyl acetate are removed by vacuum distillation at 90° C. Subsequently, a solids content of 22.8% by weight is established by adding water.

The resulting graft polymer has a K value of 19.6, a polydispersity of 1.9 ($M_w$ 35,700, $M_n$ 18,800) and a degree of branching of 0.9% (corresponds to 0.33 graft site/50 EO units).

Graft Polymer 4

A polymerization vessel equipped with stirrer and reflux condenser is initially charged with 480 g of polyethylene glycol ($M_n$ 12,000) under a nitrogen atmosphere and melted at 70° C.

After addition of 14.0 g of vinyl acetate, 1.6 g of butyl acrylate and 0.3 g of tert-butyl peroxypivalate, dissolved in 0.9 g of dipropylene glycol, and stirring for a further 5 minutes, 274 g of vinyl acetate within 6 h (feed 1), 30.4 g of butyl acrylate within 6 h (feed 2) and 6.0 g of tert-butyl peroxypivalate, dissolved in 18 g of dipropylene glycol, within 7 h (feed 3) are metered in in parallel continuously with constant flow rates at internal temperature 70° C. with stirring.

After feed 3 has ended and the mixture has been stirred at 70° C. for a further hour, 7.2 g of tert-butyl peroxypivalate, dissolved in 9.0 g of dipropylene glycol, are added in 3 portions at 70° C. with further stirring for two hours in each case. In addition, 73 g of dipropylene glycol are added to lower the viscosity.

Residual amounts of monomer are removed by vacuum distillation at 70° C. Subsequently, a solids content of 19.8% by weight is established by adding water.

The resulting graft polymer has a K value of 29.1, a polydispersity of 1.9 ($M_w$ 35,500, $M_n$ 18,400) and a degree of branching of 0.7% (corresponds to 0.13 graft site/50 EO units).

Graft Polymer 5

A polymerization pressure vessel equipped with stirrer and reflux condenser is initially charged with 1175 g of polyethylene glycol ($M_n$ 4000) under a nitrogen atmosphere and melted at 90° C.

After addition of 88.0 g of vinyl acetate and 0.85 g of tert-butyl peroxy-2-ethylhexanoate, dissolved in 3.5 g of tripropylene glycol, and stirring for a further 5 minutes, 1674 g of vinyl acetate within 6 h (feed 1) and 17.0 g of tert-butyl peroxy-2-ethylhexanoate, dissolved in 71 g of tripropylene glycol, within 7 h (feed 2) are metered in in parallel continuously with constant flow rates at internal temperature 90° C. with stirring.

After feed 2 had ended and the mixture has been stirred at 90° C. for a further hour, 39.0 g of tert-butyl peroxy-2-ethylhexanoate, dissolved in 21.0 g of tripropylene glycol, are added in 3 portions at 70° C. with further stirring for two hours in each case. In addition, 73 g of dipropylene glycol are added to lower the viscosity.

Residual amounts of vinyl acetate are removed by vacuum distillation at 90° C. Subsequently, a solids content of 23.4% by weight is established by adding water.

The resulting graft polymer has a K value of 17.9, a polydispersity of 2.3 ($M_w$ 26,800, $M_n$ 11,700) and a degree of branching of 0.6% (corresponds to 0.33 graft site/50 EO units).

Graft Polymer 6

A polymerization pressure vessel equipped with stirrer and reflux condenser is initially charged with 444 g of polyethylene glycol ($M_n$ 6000) under a nitrogen atmosphere and melted at 90° C.

After addition of 0.55 g of tert-butyl per-2-ethylhexanoate, dissolved in 1.7 g of tripropylene glycol, and stirring for a further 15 minutes, 666 g of vinyl acetate within 6 h (feed 1) and 7.22 g of tert-butyl peroxy-2-ethylhexanoate, dissolved in 21.6 g of tripropylene glycol, within 6.5 h (feed 2), and also, beginning 3 h after the start of feed 1, 233 g of alkoxylated 2-propylheptanol (1 mol of PO and 10 mol of EO/mol) within 3.5 h (feed 3) are metered in in parallel continuously with constant flow rates at internal temperature 90° C. with stirring.

After the end of feeds 2 and 3 and subsequent stirring at 90° C. for a further hour, 6.1 g of tert-butyl peroxy-2-ethylhexanoate, dissolved in 18.25 g of tripropylene glycol, are added in 3 portions at 90° C. with further stirring for two hours in each case.

Residue amounts of vinyl acetate are removed by vacuum distillation at 90° C. Subsequently, a solids content of 86.9% by weight is established by adding water.

The resulting graft polymer has K value of 17.6, a polydispersity of 1.8 ($M_w$ 35,700, $M_n$ 20,000) and a degree of branching of 0.9% (corresponds to 0.33 graft site/50 EO units).

Composition Formulations

Example 7

Granular Laundry Detergent

|  | A wt % | B wt % | C wt % | D wt % | E wt % |
|---|---|---|---|---|---|
| $C_{11-12}$ Linear alkyl benzene sulphonate | 13-25 | 13-25 | 13-25 | 13-25 | 9-25 |
| $C_{12-18}$ Ethoxylate Sulfate | — | — | 0-3 | — | 0-1 |
| $C_{14-15}$ alkyl ethoxylate (EO = 7) | 0-3 | 0-3 | — | 0-5 | 0-3 |
| Dimethyl hydroxyethyl lauryl ammonium chloride | — | — | 0-2 | 0-2 | 0-2 |
| Sodium tripolyphosphate | 20-40 | — | 18-33 | 12-22 | 0-15 |
| zeolite | 0-10 | 20-40 | 0-3 | — | — |
| silicate builder | 0-10 | 0-10 | 0-10 | 0-10 | 0-10 |
| Carbonate | 0-30 | 0-30 | 0-30 | 5-25 | 0-20 |
| diethylene triamine penta acetate | 0-1 | 0-1 | 0-1 | 0-1 | 0-1 |
| polyacrylate | 0-3 | 0-3 | 0-3 | 0-3 | 0-3 |
| Carboxy Methyl Cellulose | 0.2-0.8 | 0.2-0.8 | 0.2-0.8 | 0.2-0.8 | 0.2-0.8 |
| Polymer[1] | 0.05-10 | 0.05-10 | 5.0 | 2.5 | 1.0 |
| Percarbonate | 0-10 | 0-10 | 0-10 | 0-10 | 0-10 |
| nonanoyloxybenzenesulfonate | — | — | 0-2 | 0-2 | 0-2 |
| tetraacetylethylenediamine | — | — | 0-0.6 | 0-0.6 | 0-0.6 |
| Zinc Phthalocyanine Tetrasulfonate | — | — | 0-0.005 | 0-0.005 | 0-0.005 |
| Brightener | 0.05-0.2 | 0.05-0.2 | 0.05-0.2 | 0.05-0.2 | 0.05-0.2 |
| $MgSO_4$ | — | — | 0-0.5 | 0-0.5 | 0-0.5 |
| ENZYMES | 0-0.5 | 0-0.5 | 0-0.5 | 0-0.5 | 0-0.5 |
| MINORS (perfume, dyes, suds stabilizers) | balance | balance | balance | balance | balance |

[1]An amphiphilic graft polymer or any mixture of polymers according to any of Examples 1, 2, 3, 4, 5 or 6.

Example 8

Granular Laundry Detergent Aqueous Slurry Composition.

| Component | % w/w Aqueous slurry |
|---|---|
| A compound having the following general structure: bis(($C_2H_5O$)($C_2H_4O$)n)($CH_3$)—$N^+$—$C_xH_{2x}$—$N^+$—($CH_3$)—bis(($C_2H_5O$)($C_2H_4O$)n), wherein n = from 20 to 30, and x = from 3 to 8, or sulphated or sulphonated variants thereof | 1.23 |
| Ethylenediamine disuccinic acid | 0.35 |
| Brightener | 0.12 |
| Magnesium sulphate | 0.72 |
| Acrylate/maleate copolymer | 6.45 |
| Polymer [1] | 1.60 |
| Linear alkyl benzene sulphonate | 11.92 |
| Hydroxyethane di(methylene phosphonic acid) | 0.32 |
| Sodium carbonate | 4.32 |
| Sodium sulphate | 47.49 |
| Soap | 0.78 |
| Water | 24.29 |
| Miscellaneous | 0.42 |
| Total Parts | 100.00 |

[1] An amphiphilic graft polymer or any mixture of polymers according to any of Examples 1, 2, 3, 4, 5 or 6.

Preparation of a spray-dried powder.

An aqueous slurry having the composition as described above is prepared having a moisture content of 25.89%. The aqueous slurry is heated to 72° C. and pumped under high pressure (from $5.5 \times 10^6$ $Nm^{-2}$ to $6.0 \times 10^6$ $Nm^{-2}$), into a counter current spray-drying tower with an air inlet temperature of from 270° C. to 300° C. The aqueous slurry is atomised and the atomised slurry is dried to produce a solid mixture, which is then cooled and sieved to remove oversize material (>1.8 mm) to form a spray-dried powder, which is free-flowing. Fine material (<0.15 mm) is elutriated with the exhaust the exhaust air in the spray-drying tower and collected in a post tower containment system. The spray-dried powder has a moisture content of 1.0 wt %, a bulk density of 427 g/l and a particle size distribution such that 95.2 wt % of the spray-dried powder has a particle size of from 150 to 710 micrometers. The composition of the spray-dried powder is given below.

Spray-dried powder composition.

| Component | % w/w Spray-dried powder |
|---|---|
| A compound having the following general structure: bis(($C_2H_5O$)($C_2H_4O$)n)($CH_3$)—$N^+$—$C_xH_{2x}$—$N^+$—($CH_3$)—bis(($C_2H_5O$)($C_2H_4O$)n), wherein n = from 20 to 30, and x = from 3 to 8, or sulphated or sulphonated variants thereof | 1.65 |
| Ethylenediamine disuccinic acid | 0.47 |
| Brightener | 0.16 |
| Magnesium sulphate | 0.96 |
| Acrylate/maleate copolymer | 8.62 |
| Linear alkyl benzene sulphonate | 15.92 |
| Hydroxyethane di(methylene phosphonic acid) | 0.43 |
| Sodium carbonate | 5.77 |
| Sodium sulphate | 63.43 |
| Soap | 1.04 |
| Water | 1.00 |
| Miscellaneous | 0.55 |
| Total Parts | 100.00 |

Preparation of an Anionic Surfactant Particle 1

The anionic detersive surfactant particle 1 is made on a 520 g batch basis using a Tilt-A-Pin then Tilt-A-Plow mixer (both made by Processall). 108 g sodium sulphate supplied is added to the Tilt-A-Pin mixer along with 244 g sodium carbonate. 168 g of 70% active $C_{25}E_3S$ paste (sodium ethoxy sulphate based on $C_{12/15}$ alcohol and ethylene oxide) is added to the Tilt-A-Pin mixer. The components are then mixed at 1200 rpm for seconds. The resulting powder is then transferred into a Tilt-A-Plow mixer and mixed at 200 rpm for 2 minutes to form particles. The particles are then dried in a fluid bed dryer at a rate of 2500 l/min at 120° C. until the equilibrium relative humidity of the particles is less than 15%. The dried particles are then sieved and the fraction through 1180 μm and on 250 μm is retained The composition of the anionic detersive surfactant particle 1 is as follows:

25.0% w/w $C_{25}E_3S$ sodium ethoxy sulphate 18.0% w/w sodium sulphate 57.0% w/w sodium carbonate Preparation of a Cationic Detersive Surfactant Particle 1

The cationic surfactant particle 1 is made on a 14.6 kg batch basis on a Morton FM-50 Loedige mixer. 4.5 kg of micronised sodium sulphate and 4.5 kg micronised sodium carbonate are premixed in the Morton FM-50 Loedige mixer. 4.6 kg of 40% active mono-$C_{12-14}$ alkyl mono-hydroxyethyl di-methyl quaternary ammonium chloride (cationic surfactant) aqueous solution is added to the Morton FM-50 Loedige mixer whilst both the main drive and the chopper are operating. After approximately two minutes of mixing, a 1.0 kg 1:1 weight ratio mix of micronised sodium sulphate and micronised sodium carbonate is added to the mixer. The resulting agglomerate is collected and dried using a fluid bed dryer on a basis of 2500 l/min air at 100-140° C. for 30 minutes. The resulting powder is sieved and the fraction through 1400 μm is collected as the cationic surfactant particle 1. The composition of the cationic surfactant particle 1 is as follows:

15% w/w mono-$C_{12-14}$ alkyl mono-hydroxyethyl di-methyl quaternary ammonium chloride 40.76% w/w sodium carbonate 40.76% w/w sodium sulphate 3.48% w/w moisture and miscellaneous Preparation of a Granular Laundry Detergent Composition 10.84 kg of the spray-dried powder of example 1, 4.76 kg of the anionic detersive surfactant particle 1, 1.57 kg of the cationic detersive surfactant particle 1 and 7.83 kg (total amount) of other individually dosed dry-added material are dosed into a 1 m diameter concrete batch mixer operating at 24 rpm. Once all of the materials are dosed into the mixer, the mixture is mixed for 5 minutes to form a granular laundry detergent composition. The formulation of the granular laundry detergent composition is described below:

A granular laundry detergent composition.

| Component | % w/w granular laundry detergent composition |
|---|---|
| Spray-dried powder of example 1 | 43.34 |
| 91.6 wt % active linear alkyl benzene sulphonate flake supplied by Stepan under the tradename Nacconol 90G ® | 0.22 |
| Citric acid | 5.00 |
| Sodium percarbonate (having from 12% to 15% active AvOx) | 14.70 |
| Photobleach particle | 0.01 |
| Lipase (11.00 mg active/g) | 0.70 |
| Amylase (21.55 mg active/g) | 0.33 |
| Protease (56.00 mg active/g) | 0.43 |
| Tetraacetyl ethylene diamine agglomerate (92 wt % active) | 4.35 |
| Suds suppressor agglomerate (11.5 wt % active) | 0.87 |
| Acrylate/maleate copolymer particle (95.7 wt % active) | 0.29 |
| Green/Blue carbonate speckle | 0.50 |
| Anionic detersive surfactant particle 1 | 19.04 |
| Cationic detersive surfactant particle 1 | 6.27 |
| Sodium sulphate | 3.32 |
| Solid perfume particle | 0.63 |
| Total Parts | 100.00 |

Example 9

Liquid Laundry Detergent

| Ingredient | A wt % | B wt % | C wt % | D wt % | E wt % | F[5] wt % |
|---|---|---|---|---|---|---|
| sodium alkyl ether sulfate | 14.4% | 14.4% | | 9.2% | 5.4% | |
| linear alkylbenzene sulfonic acid | 4.4% | 4.4% | 12.2% | 5.7% | 1.3% | |
| alkyl ethoxylate | 2.2% | 2.2% | 8.8% | 8.1% | 3.4% | |
| amine oxide | 0.7% | 0.7% | 1.5% | | | |
| citric acid | 2.0% | 2.0% | 3.4% | 1.9% | 1.0% | 1.6% |
| fatty acid | 3.0% | 3.0% | 8.3% | | | 16.0% |
| protease | 1.0% | 1.0% | 0.7% | 1.0% | | 2.5% |
| amylase | 0.2% | 0.2% | 0.2% | | | 0.3% |
| lipase | | | | 0.2% | | |
| borax | 1.5% | 1.5% | 2.4% | 2.9% | | |
| calcium and sodium formate | 0.2% | 0.2% | | | | |
| formic acid | | | | | | 1.1% |
| Polymer[1] | 1.8% | 1.8% | 2.1% | | | 3.2% |
| sodium polyacrylate | | | | | 0.2% | |
| sodium polyacrylate copolymer | | | | 0.6% | | |
| DTPA[2] | 0.1% | 0.1% | | | | 0.9% |
| DTPMP[3] | | | 0.3% | | | |
| EDTA[4] | | | | | 0.1% | |
| fluorescent whitening agent | 0.15% | 0.15% | 0.2% | 0.12% | 0.12% | 0.2% |
| ethanol | 2.5% | 2.5% | 1.4% | 1.5% | | |
| propanediol | 6.6% | 6.6% | 4.9% | 4.0% | | 15.7% |
| sorbitol | | | | 4.0% | | |
| ethanolamine | 1.5% | 1.5% | 0.8% | 0.1% | | 11.0% |
| sodium hydroxide | 3.0% | 3.0% | 4.9% | 1.9% | 1.0% | |
| sodium cumene sulfonate | | | 2.0% | | | |
| silicone suds suppressor | | | 0.01% | | | |
| perfume | 0.3% | 0.3% | 0.7% | 0.3% | 0.4% | 0.6% |
| opacifier[5] | | | 0.30% | 0.20% | | 0.50% |
| water | balance | balance | balance | balance | balance | balance |
| | 100.0% | 100.0% | 100.0% | 100.0% | 100.0% | 100.0% |

[1]An amphiphilic graft polymer or any mixture of polymers according to any of Examples 1, 2, 3, 4, 5 or 6.
[2]diethylenetriaminepentaacetic acid, sodium salt
[3]diethylenetriaminepentakismethylenephosphonic acid, sodium salt
[4]ethylenediaminetetraacetic acid, sodium salt
[5]Acusol OP 301

Example 10

Liquid Dish Handwashing Detergents

| Composition | A | B |
| --- | --- | --- |
| $C_{12-13}$ Natural AE0.6S | 29.0 | 29.0 |
| $C_{10-14}$ mid-branched Amine Oxide | — | 6.0 |
| $C_{12-14}$ Linear Amine Oxide | 6.0 | — |
| SAFOL ® 23 Amine Oxide | 1.0 | 1.0 |
| $C_{11}E_9$ Nonionic[2] | 2.0 | 2.0 |
| Ethanol | 4.5 | 4.5 |
| Polymer[1] | 5.0 | 2.0 |
| Sodium cumene sulfonate | 1.6 | 1.6 |
| Polypropylene glycol 2000 | 0.8 | 0.8 |
| NaCl | 0.8 | 0.8 |
| 1,3 BAC Diamine[3] | 0.5 | 0.5 |
| Suds boosting polymer[4] | 0.2 | 0.2 |
| Water | Balance | Balance |

[1] An amphiphilic graft polymer or any mixture of polymers according to any of Examples 1, 2, 3, 4, 5 or 6.
[2] Nonionic may be either $C_{11}$ Alkyl ethoxylated surfactant containing 9 ethoxy groups.
[3] 1,3, BAC is 1,3 bis(methylamine)-cyclohexane.
[4] (N,N-dimethylamino)ethyl methacrylate homopolymer

Example 11

Automatic Dishwasher Detergent

| | A | B | C | D | E |
| --- | --- | --- | --- | --- | --- |
| Polymer dispersant[2] | 0.5 | 5 | 6 | 5 | 5 |
| Carbonate | 35 | 40 | 40 | 35-40 | 35-40 |
| Sodium tripolyphosphate | 0 | 6 | 10 | 0-10 | 0-10 |
| Silicate solids | 6 | 6 | 6 | 6 | 6 |
| Bleach and bleach activators | 4 | 4 | 4 | 4 | 4 |
| Polymer[1] | 0.05-10 | 1 | 2.5 | 5 | 10 |
| Enzymes | 0.3-0.6 | 0.3-0.6 | 0.3-0.6 | 0.3-0.6 | 0.3-0.6 |
| Disodium citrate dihydrate | 0 | 0 | 0 | 2-20 | 0 |
| Nonionic surfactant[3] | 0 | 0 | 0 | 0 | 0.8-5 |
| Water, sulfate, perfume, dyes and other adjuncts | Balance to 100% | Balance to 100% | Balance to 100% | Balance to 100% | Balance to 100% |

[1] An amphiphilic graft polymer or any mixture of polymers according to any of Examples 1, 2, 3, 4, 5 or 6.
[2] Such as ACUSOL ® 445N available from Rohm & Haas or ALCOSPERSE ® from Alco.
[3] such as SLF-18 POLY TERGENT from the Olin Corporation.

Unless otherwise noted, all component or composition levels are in reference to the active level of that component or composition, and are exclusive of impurities, for example, residual solvents or by-products, which may be present in commercially available sources.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited in the Detailed Description of the Invention are, are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A laundry detergent or cleaning composition which comprises an amphiphilic graft polymer based on water-soluble polyalkylene oxides (A) as a graft base and side chains formed by polymerization of a vinyl ester component (B), said polymer having an average of greater than 0 to less than or equal to 0.5 graft site per 50 alkylene oxide units and mean molar mass $M_W$ of from 3000 to 100000.

2. A laundry detergent or cleaning composition according to claim 1, wherein the laundry detergent or cleaning composition is selected from the group consisting of liquid laundry detergent compositions, solid laundry detergent compositions, hard surface cleaning compositions, liquid hand dishwashing compositions, solid automatic dishwashing compositions, liquid automatice dishwashing, and tab/unit dose form automatic dishwashing compositions.

3. A laundry detergent or cleaning composition according to claim 1 wherein the detergent or cleaning composition comprises from 0.05 to 10% by weight of the detergent or cleaning composition, of the amphiphilic graft polymer.

4. A laundry detergent or cleaning composition according to claim 3 wherein the amphiphilic graft polymer has a polydispesity of less than or equal to 3.

5. A laundry detergent or cleaning composition according to claim 4 wherein the amphiphilic graaft polymer comprises less than or equal to 10% by weight of the polyvinyl ester in ungrafted form.

6. A laundry detergent or cleaning composition according to claim 3 wherein the amphiphilic graft polymer has
   (A) from 20 to 70% by weight of a water-soluble polyalkylene oxide as a graft base and
   (B) side chains formed by free-radical polymerization of from 30% to 80% by weight of a vinyl ester compound composed of
      (B1) from 70 to 100% by weight of vinyl acetate and/or vinyl propionate and
      (B2) from 0 to 30% by weight of a further ethylenically unsaturated monomer in the presence of (A).

7. A laundry detergent or cleaning composition according to claim 1 wherein the detergent or composition further comprises a surfactant system.

8. A laundry detergent or cleaning composition according to claim 7 wherein the surfactant system comprises $C_{10}$-$C_{15}$ alkyl benzene sulfonate surfactant.

9. A laundry detergent or cleaning composition according to claim 7 wherein the surfactant system comprises $C_8$-$C_{18}$ linear alkyl sulfonate surfactant.

10. A laundry detergent or cleaning composition according to claim 7 wherein the surfactant system further comprises one or more co-surfactants selected from the groups consisiting of nonionic surfactants, cationic surfactants, anionic surfactants and mixtures thereof.

11. A laundry detergent or cleaning composition according to claim 7 wherein the detergent or composition further comprises cleaning adjunct additives.

12. A cleaning implement comprising a nonwoven substrate and the laundry detergent or cleaning composition according claim 11.

* * * * *